(12) United States Patent
Sayana et al.

(10) Patent No.: US 9,167,585 B2
(45) Date of Patent: Oct. 20, 2015

(54) TRANSMISSION MODE AND FEEDBACK DESIGNS TO SUPPORT MTC TYPE DEVICES IN LTE

(71) Applicant: Samsung Electronics Co., LTD, Suwon-si, Gyeonggi-do (KR)

(72) Inventors: Krishna Sayana, San Jose, CA (US); Young-Han Nam, Richardson, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 122 days.

(21) Appl. No.: 13/896,519

(22) Filed: May 17, 2013

(65) Prior Publication Data

US 2013/0308572 A1    Nov. 21, 2013

Related U.S. Application Data

(60) Provisional application No. 61/649,828, filed on May 21, 2012.

(51) Int. Cl.
*H04W 4/00* (2009.01)
*H04W 72/04* (2009.01)
*H04W 28/06* (2009.01)
*H04W 72/12* (2009.01)
*H04W 88/08* (2009.01)

(52) U.S. Cl.
CPC ............ *H04W 72/048* (2013.01); *H04W 28/06* (2013.01); *H04W 72/1289* (2013.01); *H04W 88/08* (2013.01)

(58) Field of Classification Search
CPC .......... H04W 72/048; H04W 72/1289; H04W 28/06; H04W 88/08
USPC ........ 370/328–330, 335–336, 342–343, 345, 370/347–348, 395.4, 395.41, 395.42, 370/395.43, 437, 441–444, 465
See application file for complete search history.

(56) References Cited

U.S. PATENT DOCUMENTS

| | | |
|---|---|---|
| 2004/0131026 A1 | 7/2004 | Kim et al. |
| 2010/0239259 A1 | 9/2010 | Forghieri et al. |
| 2011/0069636 A1 | 3/2011 | Shao et al. |
| 2011/0268049 A1 | 11/2011 | Luo et al. |
| 2012/0040704 A1* | 2/2012 | Kim et al. ...................... 455/509 |
| 2012/0106466 A1* | 5/2012 | Kuusela et al. ............... 370/329 |
| 2012/0188955 A1* | 7/2012 | Zhang ........................... 370/329 |

(Continued)

OTHER PUBLICATIONS

International Search Report dated Oct. 10, 2013 in connection with International Patent Application No. PCT/KR2013/004443, 3 pages.

(Continued)

*Primary Examiner* — Kevin Mew

(57) ABSTRACT

A base station is configured to support communications with at least one user equipment (UE) configured for machine type communications (MTC). The base station includes processing circuitry configured to determine a transmission scheme based on a category of the at least one UE. The base station also includes a transmitter configured to transmit, using a determined transmission scheme, a physical downlink shared channel (PDSCH) in a reduced bandwidth to the at least one UE. The UE includes a receiver configured to receive a physical downlink shared channel (PDSCH) in a reduced bandwidth from at least one base station. The UE also includes processing circuitry configured to determine a transmission scheme utilized by at least one base station.

20 Claims, 8 Drawing Sheets

(56) References Cited

U.S. PATENT DOCUMENTS

| | | | |
|---|---|---|---|
| 2012/0243500 A1* | 9/2012 | Chandrasekhar et al. | 370/330 |
| 2013/0044727 A1* | 2/2013 | Nory et al. | 370/330 |
| 2013/0064216 A1* | 3/2013 | Gao et al. | 370/330 |
| 2013/0083769 A1* | 4/2013 | Qu et al. | 370/330 |
| 2013/0182664 A1* | 7/2013 | Chen et al. | 370/329 |
| 2013/0201795 A1* | 8/2013 | Zhou et al. | 367/75 |
| 2013/0201840 A1* | 8/2013 | Sorrentino et al. | 370/252 |
| 2013/0250782 A1* | 9/2013 | Nimbalker et al. | 370/252 |
| 2013/0252606 A1* | 9/2013 | Nimbalker et al. | 455/434 |
| 2013/0343340 A1* | 12/2013 | Seo et al. | 370/330 |
| 2014/0301283 A1* | 10/2014 | Frenne et al. | 370/329 |
| 2014/0321421 A1* | 10/2014 | Popovic et al. | 370/330 |

OTHER PUBLICATIONS

3GPP TSG RAN WG5 Meeting #48; R1 test for Category 1 UE—Supporting Paper for R5-105047; Huawei; Aug. 23-27, 2010; Madrid, Spain.

* cited by examiner

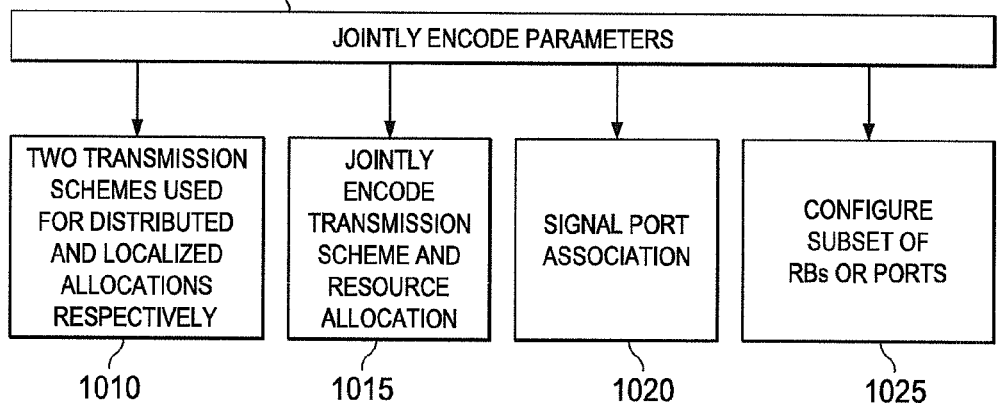
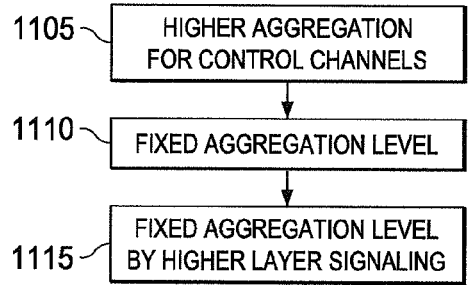
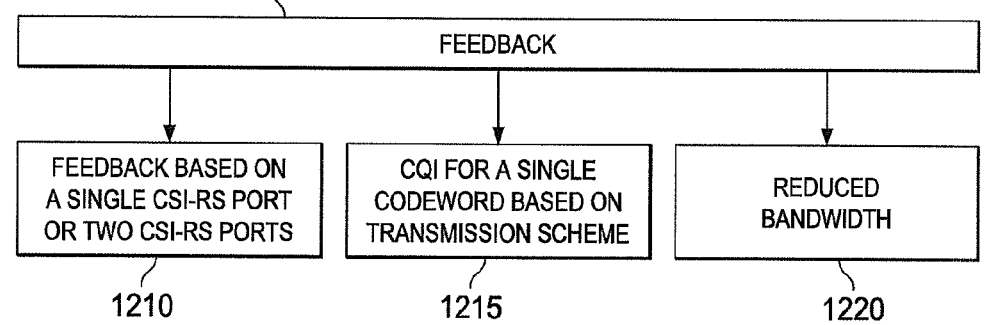

TRANSMISSION MODE AND FEEDBACK DESIGNS TO SUPPORT MTC TYPE DEVICES IN LTE

CROSS-REFERENCE TO RELATED APPLICATION(S) AND CLAIM OF PRIORITY

The present application claims priority to U.S. Provisional Patent Application Ser. No. 61/649,828, filed May 21, 2012, entitled "TRANSMISSION MODE AND FEEDBACK DESIGNS TO SUPPORT MTC TYPE DEVICES IN LTE." The content of the above-identified patent documents is incorporated herein by reference.

TECHNICAL FIELD

The present application relates generally to wireless communications and, more specifically, to a system and method for transmission mode and feedback designs for machine type communication devices.

BACKGROUND

Machine Type Communications (MTC), or Machine-to-Machine (M2M) communications, is expanding rapidly. MTC (or M2M) is a form of communication that involves one or more entities that do not necessarily require human interaction. MTC devices include meters, sensors, healthcare devices, cars, smart phones, road security, and other consumer electronic devices. Since machines are excellent at routine and well-defined tasks that require a constant level of attention and machines can react to inputs very quickly, MTC devices allow people to avoid dull and repetitious work.

SUMMARY

A base station configured to communicate with at least one user equipment (UE) configured for machine type communications (MTC) is provided. The base station includes processing circuitry configured to determine a transmission scheme based on a category of the at least one UE. The base station also includes a transmitter configured to transmit, using a determined transmission scheme, a physical downlink shared channel (PDSCH) in a reduced bandwidth to the at least one UE.

A method for communicating with at least one user equipment (UE) configured for machine type communications (MTC) is provided. The method includes determining a transmission scheme based on a category of the at least one UE. The method also includes transmitting, using a determined transmission scheme, a physical broadcast channel (PBCH) in a reduced bandwidth to the at least one UE.

A system user equipment (UE) configured for machine type communications (MTC) is provided. The UE includes a receiver configured to receive a physical downlink shared channel (PDSCH) in a reduced bandwidth from at least one base station. The UE also includes processing circuitry configured to determine a transmission scheme utilized by at least one base station.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 10 illustrates a process for jointly encoding parameters for an MTC device according to embodiments of the present disclosure;

FIG. 11 illustrates a process higher aggregation for control channels for an MTC device according to embodiments of the present disclosure; and FIG. 12 illustrates a process for feedback for an MTC device according to embodiments of the present disclosure.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein: (i) 3GPP TS 36.211 v10.1.0, "E-UTRA, Physical channels and modulation" (hereinafter "REF1"); (ii) 3GPP TS 36.212 v10.1.0, "E-U IRA, Multiplexing and Channel coding" (hereinafter "REF2"); and (iii) 3GPP TS 36.213 v10.1.0, "E-UTRA, Physical Layer Procedures" (hereinafter "REF3").

With regard to the following description, it is noted that the LTE terms "node B," "enhanced node B," and "eNodeB" are other terms for "base station" used below. A base station as described herein may have a globally unique identifier, known as a base station identifier (BSID). For some embodiments, the BSID may be a MAC ID. Also, a base station can have multiple cells (e.g., one sector can be one cell), each with a physical cell identifier, or a preamble sequence, which may be carried in a synchronization channel. In addition, the LIE term "user equipment" or "UE" is another term for "subscriber station" used below, and a "mobile station" as described herein is interchangeable with a "subscriber station."

In the following, a lite User Equipment (UE) refers to a UE that can be implemented with low cost. An MTC UE can be a lite UE. A legacy UE, or a regular UE, or non-lite UE, refers to a UE that is a regular UE and that can use the system designed for a regular UE, not the special system designed for lite UE. The terms are mainly applicable in 3GPP/LTE/LTE-A, however, the technologies are not limited to these systems, rather, they can be applied to other systems where the terms may be called as other names.

Figure 1:
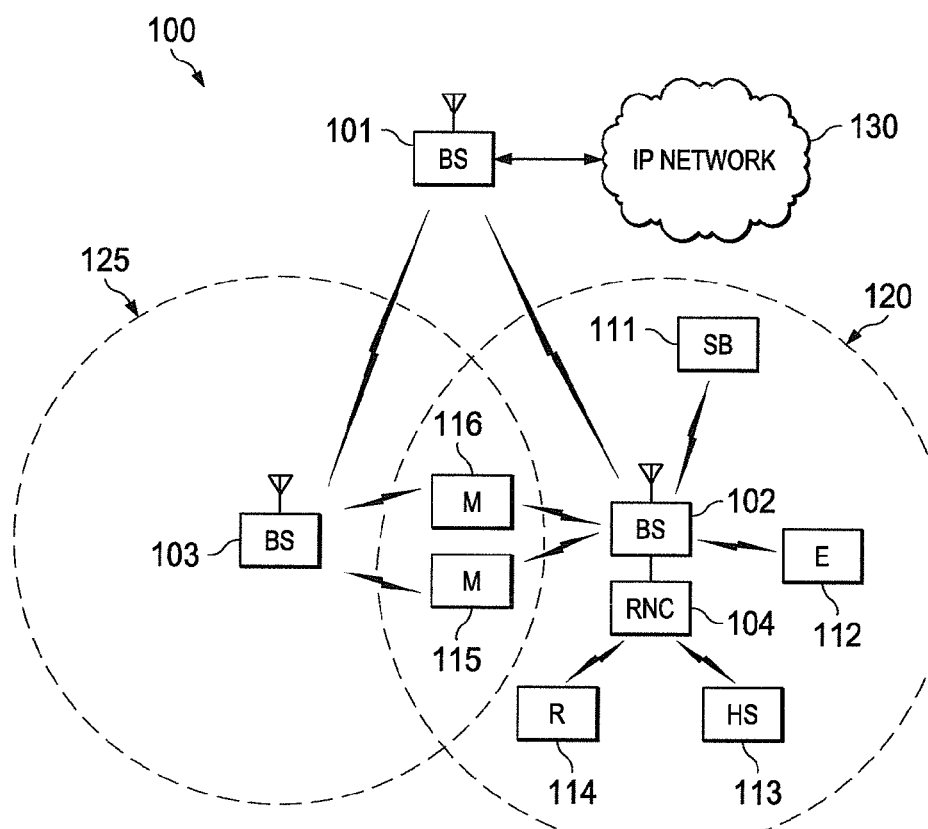
FIG. 1 illustrates an exemplary wireless network according to one embodiment of the present disclosure.

FIG. 1 illustrates a wireless network 100 according to one embodiment of the present disclosure. The embodiment of wireless network 100 illustrated in FIG. 1 is for illustration only. Other embodiments of wireless network 100 could be used without departing from the scope of this disclosure.

The wireless network 100 includes eNodeB (eNB) 101, eNB 102, and eNB 103. The eNB 101 communicates with eNB 102 and eNB 103. The eNB 101 also communicates with Internet protocol (IP) network 130, such as the Internet, a proprietary IP network, or other data network.

Depending on the network type, other well-known terms may be used instead of "eNodeB," such as "base station" or "access point". For the sake of convenience, the term "eNodeB" shall be used herein to refer to the network infrastructure components that provide wireless access to remote terminals. In addition, the term user equipment (UE) is used herein to refer to remote terminals that can be used by a consumer to access services via the wireless communications network. Other well known terms for the remote terminals include "mobile stations" and "subscriber stations."

The eNB 102 provides wireless broadband access to network 130 to a first plurality of user equipments (UEs) within coverage area 120 of eNB 102. The first plurality of UEs includes UE 111, which may be located in a small business; UE 112, which may be located in an enterprise; UE 113, which may be located in a WiFi hotspot; UE 114, which may be located in a first residence; UE 115, which may be located in a second residence; and UE 116, which may be a mobile device, such as a cell phone, a wireless laptop, a wireless PDA, or the like. UEs 111-116 may be any wireless communication device, such as, but not limited to, a mobile phone, mobile PDA and any mobile station (MS).

For the sake of convenience, the term "user equipment" or "UE" is used herein to designate any remote wireless equipment that wirelessly accesses an eNB, whether the UE is a mobile device (e.g., cell phone) or is normally considered a stationary device (e.g., desktop personal computer, vending machine, etc.). In other systems, other well-known terms may be used instead of "user equipment", such as "mobile station" (MS), "subscriber station" (SS), "remote terminal" (RT), "wireless terminal" (WT), and the like.

The eNB 103 provides wireless broadband access to a second plurality of UEs within coverage area 125 of eNB 103. The second plurality of UEs includes UE 115 and UE 116. In some embodiments, one or more of eNBs 101-103 may communicate with each other and with UEs 111-116 using LTE or LTE-A techniques including techniques for: transmission modes and feedback designs to support machine type communication (MTC) devices in Long Term Evolution (LTE) as described in embodiments of the present disclosure.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Although FIG. 1 depicts one example of a wireless network 100, various changes may be made to FIG. 1. For example, another type of data network, such as a wired network, may be substituted for wireless network 100. In a wired network, network terminals may replace eNBs 101-103 and UEs 111-116. Wired connections may replace the wireless connections depicted in FIG. 1.

Figure 2:
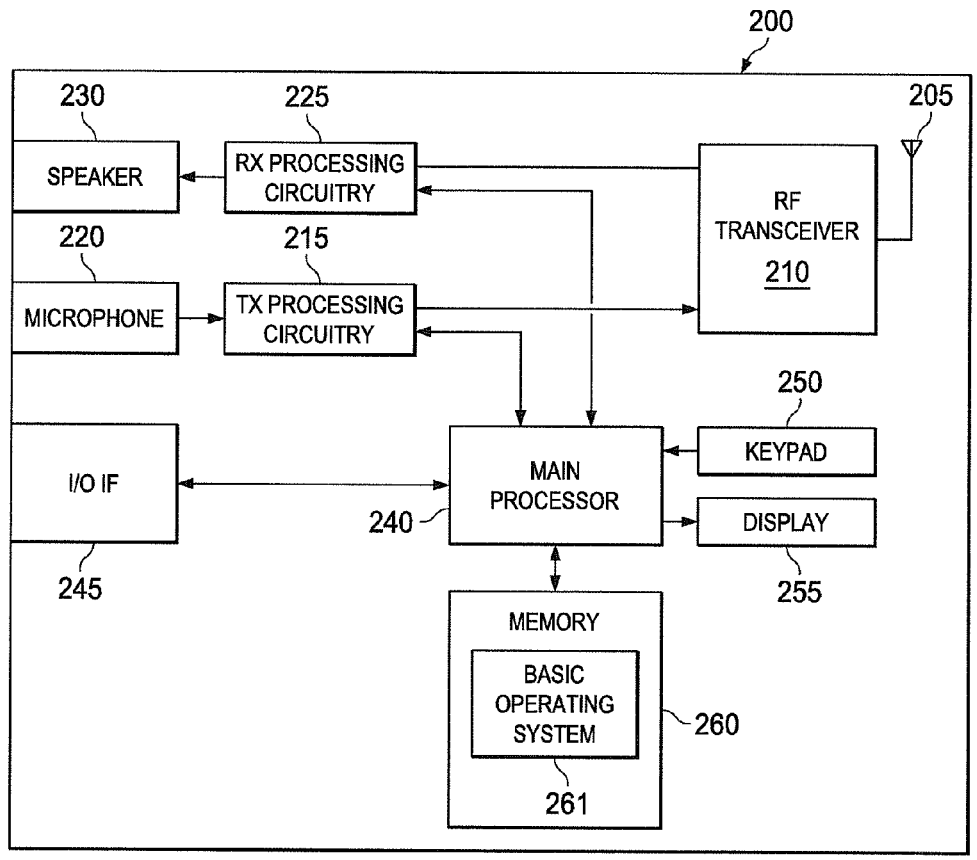
FIG. 2 illustrates a wireless mobile station according to embodiments of the present disclosure.

FIG. 2 illustrates a wireless mobile station according to embodiments of the present disclosure. In certain embodiments, the wireless UE 200 may represent any of the subscriber stations 111-116 shown in FIG. 1. The embodiment of the wireless UE 200 illustrated in FIG. 2 is for illustration only. Other embodiments of the wireless UE 200 could be used without departing from the scope of this disclosure.

The wireless UE 200 comprises an antenna 205, a radio frequency (RF) transceiver 210, transmit (TX) processing circuitry 215, a microphone 220, receive (RX) processing circuitry 225 and a speaker 230. The UE 200 also comprises a main processor 240, an input/output (I/O) interface (IF) 245, a keypad 250, a display 255 and a memory 260.

The RF transceiver 210 receives from the antenna 205 an incoming RF signal transmitted by a base station of the wireless network 100. The RF transceiver 210 down-converts the incoming RF signal to produce an intermediate frequency (IF) or a baseband signal. The IF or baseband signal is sent to the RX processing circuitry 225 that produces a processed baseband signal by filtering, decoding and/or digitizing the baseband or IF signal. The RX processing circuitry 225 transmits the processed baseband signal to the speaker 230 (i.e., voice data) or to the main processor 240 for further processing (e.g., web browsing).

The TX processing circuitry 215 receives analog or digital voice data from the microphone 220 or other outgoing baseband data (e.g., web data, e-mail, interactive video game data) from the main processor 240. The TX processing circuitry 215 encodes, multiplexes and/or digitizes the outgoing baseband data to produce a processed baseband or IF signal. The RF transceiver 210 receives the outgoing processed baseband or IF signal from the TX processing circuitry 215. The RF transceiver 210 up-converts the baseband or IF signal to a RF signal that is transmitted via the antenna 205.

In some embodiments of the present disclosure, the main processor 240 is processing circuitry, such as a microprocessor or microcontroller. The memory 260 is coupled to the main processor 240. The memory 260 can be any computer-readable medium. For example, the memory 260 can be any electronic, magnetic, electromagnetic, optical, electro-optical, electro-mechanical and/or other physical device that can contain, store, communicate, propagate, or transmit a computer program, software, firmware, or data for use by the microprocessor or other computer-related system or method. According to such embodiments, part of the memory 260 comprises a random access memory (RAM) and another part of the memory 260 comprises a Flash memory, which acts as a read-only memory (ROM).

The main processor 240 executes a basic operating system program 261 stored in the memory 260 in order to control the overall operation of the mobile station 200. In one such operation, the main processor 240 controls the reception of forward channel signals and the transmission of reverse channel signals by the RF transceiver 210, the RX processing circuitry 225, and the TX processing circuitry 215, in accordance with well-known principles.

The main processor 240 is capable of executing other processes and programs resident in the memory 260, such as operations for transmission modes and feedback designs to support machine type communication (MTC) devices in Long Term Evolution (LTE) as described in embodiments of the present disclosure. The main processor 240 can move data into or out of the memory 260, as required by an executing process. The main processor 240 can move data into or out of the memory 260, as required by an executing process. The main processor 240 is also coupled to the I/O interface 245. The I/O interface 245 provides UE 200 with the ability to connect to other devices such as laptop computers and handheld computers. The I/O interface 245 is the communication path between these accessories and the main processor 240.

The main processor 240 is also coupled to the keypad 250 and the display unit 255. The operator of UE 200 uses the keypad 250 to enter data into UE 200. The display 255 may be a liquid crystal, light emitting diode (LED) or organic LED (OLED) display capable of rendering text and/or graphics from web sites. Alternate embodiments may use other types of displays. For example, for an embodiment in which the display 255 is a touch-screen display, the keypad 250 may be provided via the display 255.

Although FIG. 2 depicts one example of a mobile station, various changes may be made to FIG. 2. For example, a wired or wireless network terminal may be substituted for UE 200. A wired network terminal may or may not include components for wireless communication, such as an antenna. Additionally, in certain embodiments, UE 200 is a MTC device.

Figure 3:
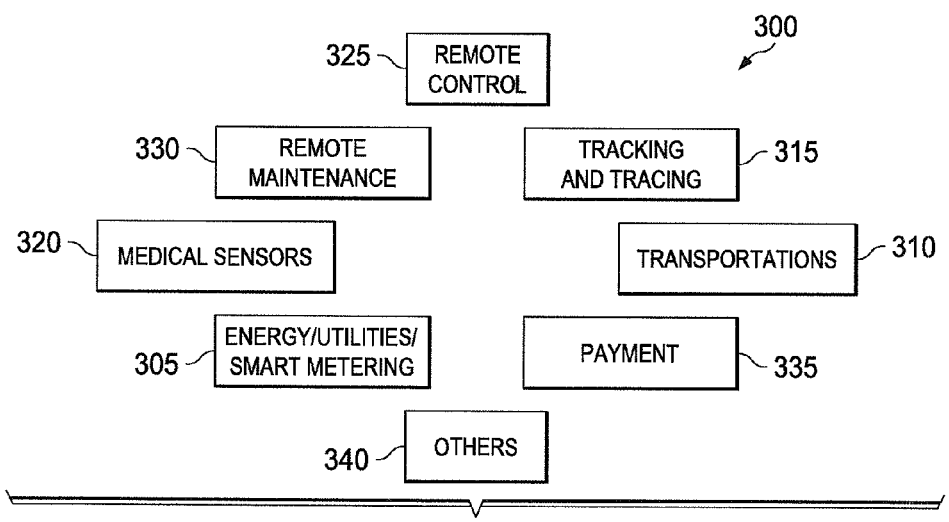
FIG. 3 illustrates some use cases of machine-type communications according to the present disclosure.

FIG. 3 illustrates a machine-type communications according to the disclosure. The embodiment of the machine-type communications (MTC) shown in FIG. 3 is for illustration only. Other embodiments could be used without departing from the scope of this disclosure.

Use cases of MTC 300 include metering 305, road security and wireless connectivity in automobiles 310, tracing and tracking 315, healthcare devices 320, sensors, remote controls 325, remote maintenance 330, payment systems 335 and others 340 including consumer electronic devices, such as smart phones, e-book readers, digital picture frames, connected sports devices, and the like. MTC also is important for many emerging use cases.

The communication functionalities defined for a legacy Long Term Evolution (LTE) User Equipment (UE) can be supported by MTC UEs as well. However, in order to tailor the cost of terminals for the low-end of the MTC market to be competitive with that of Global System for Mobile Communications (GSM)/General Packet Radio Service (GPRS) terminals, it can be considered that low cost LTE MTC UEs support a limited set of functionalities compared to normal LIE, UEs, toward reducing the implantation cost and complexity with meeting the performance requirements for low cost MTC UEs at the same time. The feature down-selection may be applicable to low cost voice-support LTE UEs in future if necessary.

Although embodiments of the present disclosure illustrate an MTC UE by way of example, it must be understood, the described teachings, methods and embodiments equally apply to any new UE category or categories that may be defined. In one case, these may more generally apply to UE categories that target one or more features like low complexity, low cost or other simplifications. More generally, such embodiments may be used for any UE category.

In 3GPP RAN #53 meeting, the study item for low-cost MTC (machine-type communications) UEs based on LTE was approved (See RP-111112, "SID: Provision of low-cost MTC UEs based on LTE", 3GPP TSG RAN#53, Vodafone, Fukuoka, Japan, 13-16 Sep., 2011, the contents of which are hereby incorporated by reference in their entirety). Support for Machine-Type Communication devices in Long Term Evolution (LTE) is being studied and these devices are in general considered for very low data rate applications. The main considerations to support low cost MTC UE based on LTE include at least the following aspects:

1) Benefit of developing methods for reducing RF component cost in the devices, including (for example) simplifications and reductions in support of bands/RATs/RF chains/antenna ports, transmission power, maximum channel bandwidth less than the maximum specified for respective frequency band, and support of half-duplex FDD mode;

2) Benefit of developing methods for reducing the processing in the device, additionally considering baseband-RF conversion aspects, significantly lower peak data rate support, no support of spatial processing mode in uplink/downlink, and reduced radio protocol processing; and 3) A method to guarantee that any features recommended as part of this study to allow cost reduction, but which also bring a reduction in LTE system performance, shall be restricted to devices THAT only operate as MTC devices not requiring high data rates and/or low latency, after further careful study.

Overall this means that such devices should coexist well with other (higher data rate) devices without significantly impacting the system while supporting the low cost targets envisioned for machine type devices.

Embodiments, of the present disclosure provide methods, systems and an apparatus for transmission mode and feedback designs to support low cost MTC type devices in LTE.

DMRS Scrambling Sequence (from TS 36.211)

For any of the antenna ports $p \in \{7, 8, \ldots, \upsilon+6\}$, the reference-signal sequence $r(m)$ is defined by Equation 1:

$$r(m) = \frac{1}{\sqrt{2}}(1 - 2 \cdot c(2m)) + j\frac{1}{\sqrt{2}}(1 - 2 \cdot c(2m+1)), \quad (1)$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

The pseudo-random sequence $c(i)$ is defined in Section 7.2. The pseudo-random sequence generator shall be initialized with $c_{init} = (\lfloor n_S/2 \rfloor + 1) \cdot (2N_{ID}^{cell} + 1) \cdot (2N_{ID}^{cell} + 1) \cdot 2^{16} + n_{SCID}$ at the start of each subframe. The value of $n_{SCID}$ is zero unless specified otherwise. For a PDSCH transmission on ports 7 or 8, $n_{SCID}$ is given by the DCI format 2B or 2C (See REF3) associated with the PDSCH transmission. In the case of DCI format 2B, $n_{SCID}$ is indicated by the scrambling identity field according to Table 1:

TABLE 1

Mapping of scrambling identity field in DCI format 2B to $n_{SCID}$ values for antenna ports 7 and 8.

| Scrambling identity field in DCI format 2B [REF3] | $n$SCID |
|---|---|
| 0 | 0 |
| 1 | 1 |

UE-RS Mapping for Antenna Ports (APs) 7-14 (from TS 36.211)

For antenna ports p=7, p=8 or p=7, 8, . . . , υ+6, in a physical resource block with frequency-domain index $n_{PRB}$ assigned for the corresponding PDSCH transmission, a part of the reference signal sequence r(m) is mapped to complex-valued modulation symbols $a_{k,1}^{(p)}$ in a subframe according to Equation 2 for Normal cyclic prefix:

$$a_{k,1}^{(p)} = w_p(1') \cdot r(3 \cdot 1' \cdot N_{RB}^{max,DL} + 3 \cdot n_{PRB} + m') \quad (2)$$

where the sequence $\overline{w}_p(i)$ is given by Table 2:

TABLE 2

| The sequence $\overline{w}_p(i)$ for normal cyclic prefix | |
|---|---|
| Antenna port$_p$ | [$\overline{w}_p(0)$ $\overline{w}_p(1)$ $\overline{w}_p(2)$ $\overline{w}_p(3)$] |
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

Equation 4 is utilized for extended cyclic prefix:

$$a_{k,l}^{(p)} = w_p(l' \bmod 2) \cdot r(4 \cdot l' \cdot N_{RB}^{max,DL} + 4 \cdot n_{PRB} + m') \quad (4)$$

Where:

$$w_p(i) = \begin{cases} \overline{w}_p(i) & m' \bmod 2 = 0 \\ \overline{w}_p(1-i) & m' \bmod 2 = 1 \end{cases}$$

$$k = 3m' + N_{sc}^{RB} n_{PRB} + k'$$

$$k' = \begin{cases} 1 & \text{if } n_s \bmod 2 = 0 \text{ and } p \in \{7, 8\} \\ 2 & \text{if } n_s \bmod 2 = 1 \text{ and } p \in \{7, 8\} \end{cases}$$

$$l = l' \bmod 2 + 4$$

$$l' = \begin{cases} 0, 1 & \text{if } n_s \bmod 2 = 0 \text{ and in a special subframe with configuration } 1, 2, 3, 5 \text{ or } 6 \text{ (see Table 1)} \\ 0, 1 & \text{if } n_s \bmod 2 = 0 \text{ and not in a special subframe} \\ 2, 3 & \text{if } n_s \bmod 2 = 1 \text{ and not in a special subframe} \end{cases}$$

$$m' = 0, 1, 2, 3$$

The sequence $\overline{w}_p(i)$ is given by Table 3.

TABLE 3

| The sequence $\overline{w}_p(i)$ for extended cyclic prefix. | |
|---|---|
| Antenna port p | [$\overline{w}_p(0)$ $\overline{w}_p(1)$] |
| 7 | [+1 +1] |
| 8 | [−1 +1] |

For extended cyclic prefix, UE-specific reference signals are not supported on antenna ports 9 to 14.

Resource elements (k,1) used for transmission of UE-specific reference signals to one UE on any of the antenna ports in the set S, where S={7,8,11,13} or S={9,10,12,14} shall not be used for transmission of PDSCH on any antenna port in the same slot, and not be used for UE-specific reference signals to the same UE on any antenna port other than those in s in the same slot.

Figure 4A:
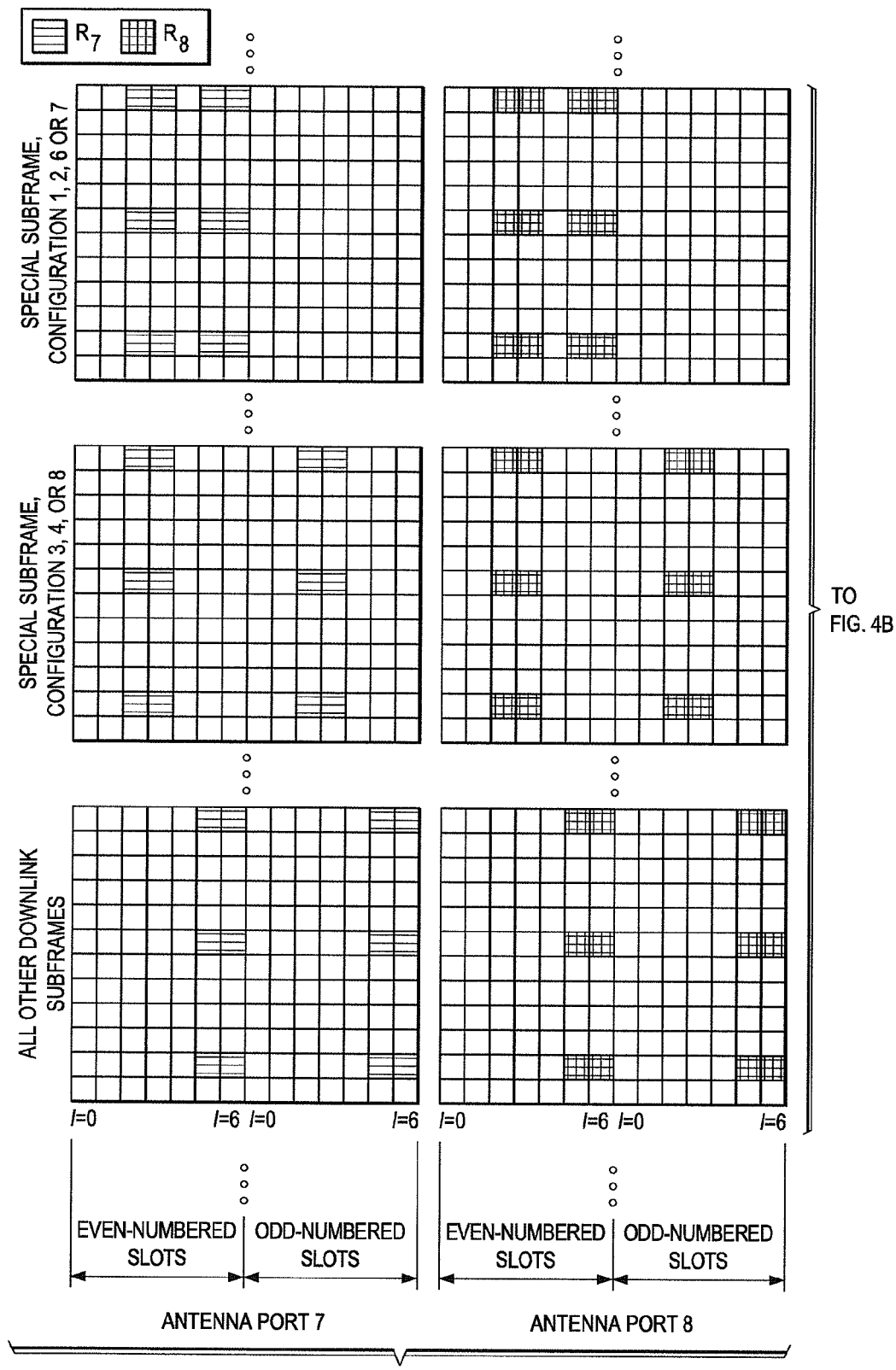
FIG. 4 illustrates mapping of UE-Specific reference signals for a normal cyclic prefix for antenna ports 7, 8, 9 and 10 according to embodiments of the present disclosure.
Figure 4B:
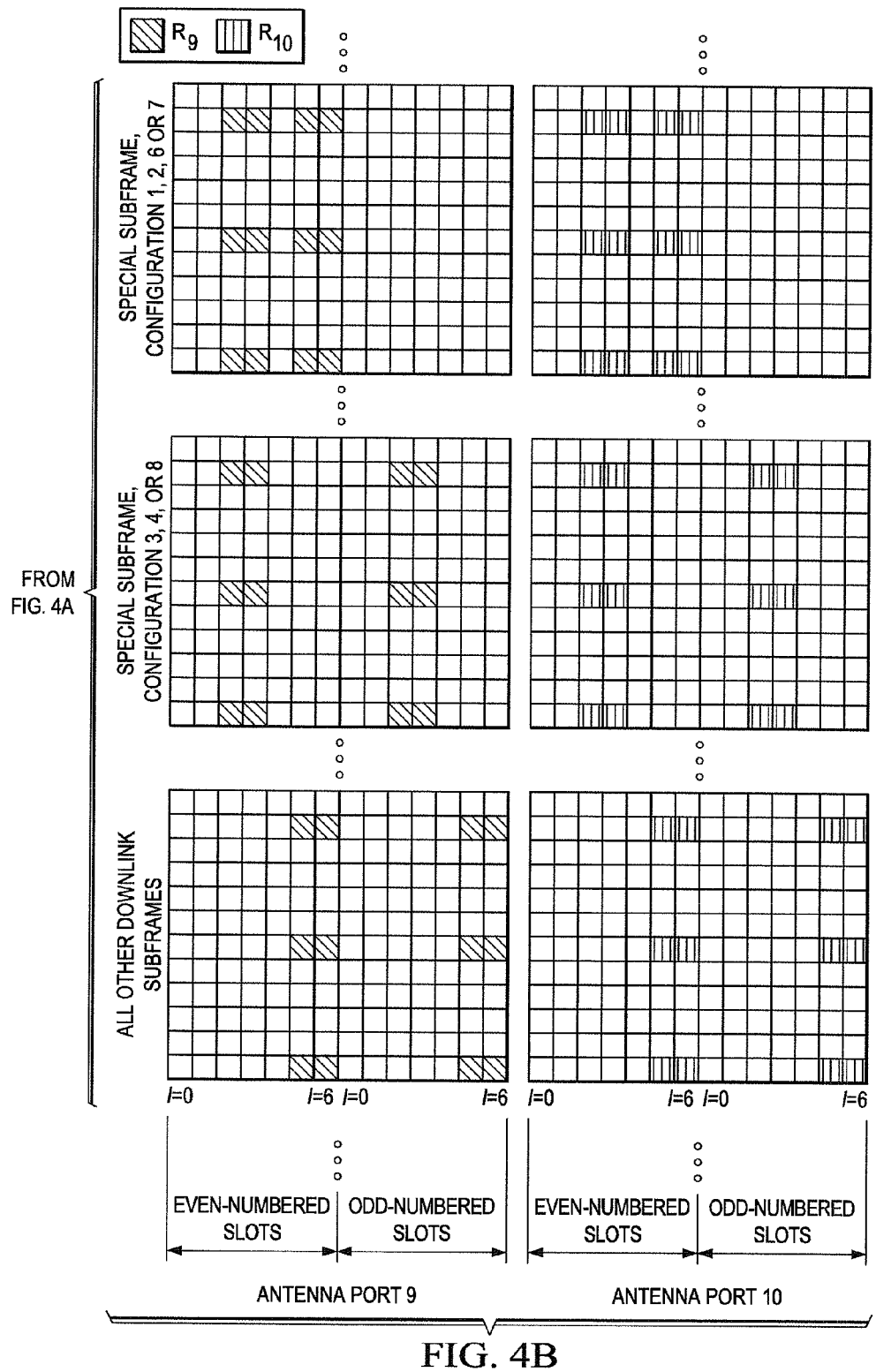

FIG. 4 illustrates mapping of UE-Specific reference signals for a normal cyclic prefix for antenna ports 7, 8, 9 and 10 according to embodiments of the present disclosure. The embodiment of the mapping shown in FIG. 4 is for illustration only. Other embodiments could be used without departing from the scope of this disclosure.

Figure 5:
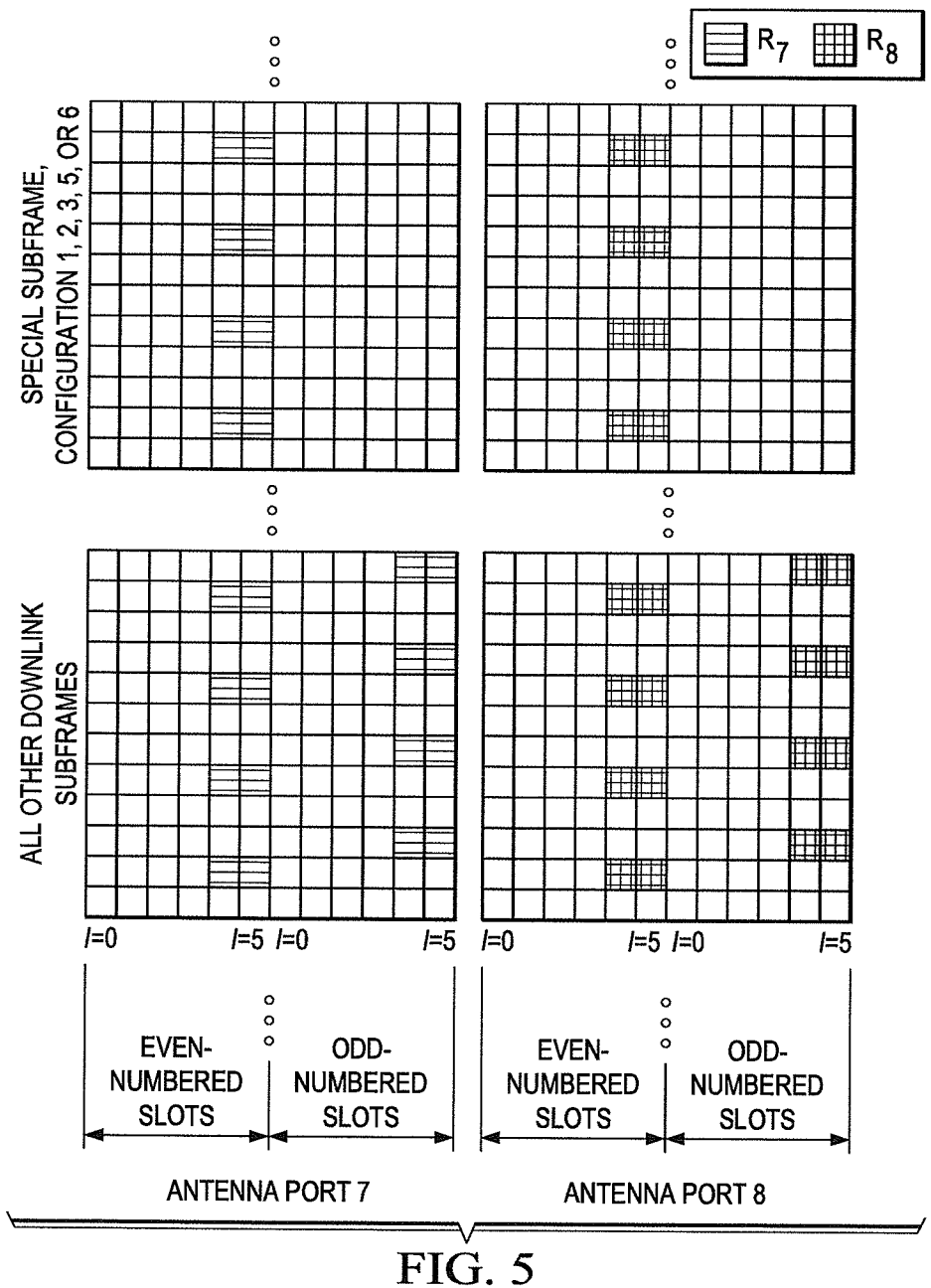
FIG. 5 illustrates resource elements used for UE-specific reference signals for extended cyclic prefix for antenna ports 7, 8 according to embodiments of the present disclosure.

FIG. 5 illustrates resource elements used for UE-specific reference signals for extended cyclic prefix for antenna ports 7, 8 according to embodiments of the present disclosure. The embodiment of the resource elements used for UE-specific reference signals shown in FIG. 5 is for illustration only. Other embodiments could be used without departing from the scope of this disclosure.

Embodiments of the present disclosure provide for a UE 200 that is an MTC UE. Although the examples illustrated herein refer to a MTC UE, the described teachings, methods and embodiments equally apply to any new UE category or categories that may be defined. In one case, these may more generally apply to UE categories that target one or more features like low complexity, low cost or other simplifications. More generally, such embodiments may be used for any UE category.

New Designs for MTC

Embodiments of the present disclosure provide for a plurality of transmission modes for the MTC. For example, the following transmission modes are supported:

TABLE 4

| PDCCH and PDSCH configured by C-RNTI | | | |
|---|---|---|---|
| Transmission mode | DCI format | Search Space | Transmission scheme of PDSCH corresponding to PDCCH |
| Mode 1 | DCI format 1A | Common and UE specific by C-RNTI | Single-antenna port, port 0 (see 3GPP 36.213 (REF4), Table 7.1-5 subclause 7.1.1) |
|  | DCI format 1 | UE specific by C-RNTI | Single-antenna port, port 0 (see REF4 subclause 7.1.1) |
| Mode 2 | DCI format 1A | Common and UE specific by C-RNTI | Transmit diversity (see REF4 subclause 7.1.2) |
|  | DCI format 1 | UE specific by C-RNTI | Transmit diversity (see REF4 subclause 7.1.2) |

TABLE 4-continued

PDCCH and PDSCH configured by C-RNTI

| Transmission mode | DCI format | Search Space | Transmission scheme of PDSCH corresponding to PDCCH |
|---|---|---|---|
| Mode 3 | DCI format 1A | Common and UE specific by C-RNTI | Transmit diversity (see REF4 subclause 7.1.2) |
| | DCI format 2A | UE specific by C-RNTI | Large delay CDD (see REF4 subclause 7.1.3) or Transmit diversity (see REF4 subclause 7.1.2) |
| Mode 4 | DCI format 1A | Common and UE specific by C-RNTI | Transmit diversity (see subclause 7.1.2) |
| | DCI format 2 | UE specific by C-RNTI | Closed-loop spatial multiplexing (see REF4 subclause 7.1.4)or Transmit diversity (see REF4 subclause 7.1.2) |
| Mode 5 | DCI format 1A | Common and UE specific by C-RNTI | Transmit diversity (see REF4 subclause 7.1.2) |
| | DCI format 1D | UE specific by C-RNTI | Multi-user MIMO (see REF4 subclause 7.1.5) |
| Mode 6 | DCI format 1A | Common and UE specific by C-RNTI | Transmit diversity (see REF4 subclause 7.1.2) |
| | DCI format 1B | UE specific by C-RNTI | Closed-loop spatial multiplexing (see REF4 subclause 7.1.4) using a single transmission layer |
| Mode 7 | DCI format 1A | Common and UE specific by C-RNTI | If the number of PBCH antenna ports is one, Single-antenna port, port 0 is used (see REF4 subclause 7.1.1), otherwise Transmit diversity (see REF4 subclause 7.1.2) |
| | DCI format 1 | UE specific by C-RNTI | Single-antenna port, port 5 (see REF4 subclause 7.1.1) |
| Mode 8 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
| | DCI format 2B | UE specific by C-RNTI | Dual layer transmission, port 7 and 8 (see subclause 7.1.5A) or single-antenna port, port 7 or 8 (see subclause 7.1.1) |
| Mode 9 | DCI format 1A | Common and UE specific by C-RNTI | Non-MBSFN subframe: If the number of PBCH antenna ports is one, Single-antenna port, port 0 is used (see subclause 7.1.1), otherwise Transmit diversity (see subclause 7.1.2) MBSFN subframe: Single-antenna port, port 7 (see subclause 7.1.1) |
| | DCI format 2C | UE specific by C-RNTI | Up to 8 layer transmission, ports 7-14 (see subclause 7.1.5B) |

However, a number of simplifications can be made for MTC devices to lower the cost, complexity and taking into account MTC applications and data profiles. Some of these simplifications include:

Reduction of Rx antennas to one;
Reduction of bandwidth;
Half-duplex FDD; and
Reduction of transmit power.

The supported transmission modes can also be reduced given the above considerations. Definitions of some transmission schemes can be considered for this purpose for MTC devices.

Transmission Schemes

Scheme 1: Transmit Diversity

In certain embodiments, transmit diversity schemes (Space Frequency Block Coding (SFBC) or Space-Time Block Coding (STBC)) are supported for MTC. Cognitive Radio Services (CRS) based SFBC and STBC are supported in Release-10 LTE. Additional Alamouti transmit diversity scheme can be based on Demodulation Reference Signal (DMRS) based decoding. Such transmit diversity scheme could be based on ports (7,8) or ports (7,9).

Scheme 2: Single Port DMRS (per Physical Resource Block (PRB) precoder cycling or pecoder based on known Channel State Information (CSI))

In certain embodiments, precoder cycling is used at the transmitter, such as eNB 102.

In one method, one precoder codeword (CW)/PRB pair is used by the transmitter. In this case, a single DMRS port is used for channel estimation and the precoding cycling is transparent to UE 200. UE 200 may be required to assume PRB bundling is turned off. This can be supported based on a single DMRS port transmission scheme (e.g., port 7). The single port allocation can be configurable.

Scheme 3: Multi-Port DMRS (Mini-PRB Cycling)

In another method, N precoder CW/PRB pairs are used by the transmitter, such as eNB 102. In this case, each port corresponds to a mini-RB within a PRB pair. A mini-RB is a subset of resource elements (Res) within a PRB pair. The mini-RBs are defined and UE 200 decodes each min-RB based on one of the N DMRS ports. N could take values of 1, 2 or 4 and may be configurable by the network. In one example, N=1, 2, and 4 respectively correspond to DMRS ports {7}, {7, 8} or {7, 8, 9, 10}. In another example, N=1 corresponds to one of DMRS ports {7}, {8}, {9} and {10}, and the DMRS port is configurable. In another example, N=2 corresponds to one of DMRS ports {7,8} and {9,10} and the DMRS ports are configurable. Cycling within a PRB pair can achieve higher diversity for smaller allocation sizes (e.g., 1 resource block (RB), 2RB). In one method, value of N may depend on size of allocation.

Figure 6:
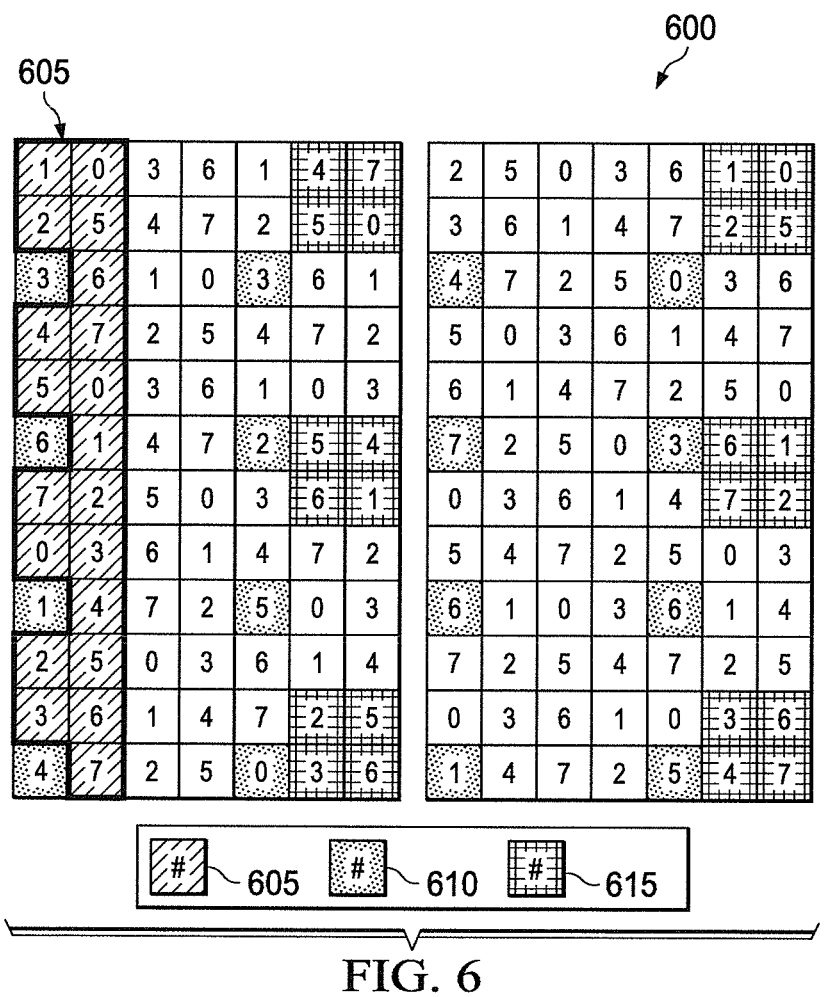
FIG. 6 illustrates a resource element groups assigned to mini-physical resource blocks according to embodiments of the present disclosure.

FIG. 6 illustrates a resource element groups assigned to mini-physical resource blocks according to embodiments of the present disclosure. The embodiment of the mini-PRBs shown in FIG. 6 is for illustration only. Other embodiments could be used without departing from the scope of this disclosure.

The mapping 600 includes a control region 605, cell specific reference signals (CRS) 610 and DMRS 615. In the example shown in FIG. 6, eight resource element groups (REGs) (indexed 0-7) are assigned to a mini-PRB. One or two REGs (or Control Channel Elements (CCEs), or in general, a group of REs) and each of the mini PRBs (1,2,3,4) is in turn assigned to a DMRS port (e.g., mini-PRBs 1 to Port 7, mini-PRBs 2 to port 8, mini-PRBs 3 to port 9, mini-PRBs 4 to port 10).

For example, when one REG is assigned to a mini PRB, then REGs indexed as "0" can be included in mini PRB-0; REGs indexed as "1" can be included in mini PRB-1; REGs indexed as "2" can be included in mini PRB-2; REGs indexed as "3" can be included in mini PRB-3; REGs indexed as "4" can be included in mini PRB-4; REGs indexed as "5" can be included in mini PRB-5; REGs indexed as "6" can be included in mini PRB-6; and REGs indexed as "7" can be included in mini PRB-7. In another example, when two REGs are assigned to a mini PRB, then REGs indexed as "0" and "1" can be included in mini PRB-1; REGs indexed as "2" and "3" can be included in mini PRB-2; REGs indexed as "4" and "5" can be included in mini PRB-3; and REGs indexed as "6" and "7" can be included in mini PRB-4. The mini-PRBs is, in turn, assigned to a DMRS port. For example, mini-PRBs 1 is assigned to Port 7, mini-PRBs 2 is assigned to port 8, mini-PRBs 3 is assigned to port 9, mini-PRBs 4 is assigned to port 10). Although the examples above illustrate specific REG to mini PRB assignments and mini-PRB to DMRS port assignments, other combinations of REGs assigned to mini-PRBs and different assignments of mini-PRBs to DMRS ports are contemplated without departing from the scope of this disclosure.

In another method, one or more mini-PRBs are mapped to a DMRS port. For example, mini-PRBs 1 and 2 are assigned to Port 7, and mini-PRBs 2 and 3 are assigned to port 8, and so forth). Although the examples above illustrate specific REG to mini PRB assignments and mini-PRB to DMRS port assignments, other combinations of REGs assigned to mini-PRBs and different assignments of mini-PRBs to DMRS ports are contemplated without departing from the scope of this disclosure. Additionally, although the illustrates examples shows two mini-PRBs assigned per DMRS port, embodiments with three or more mini-PRBs assigned per DMRS port could be used without departing from the scope of this disclosure.

Figure 7:
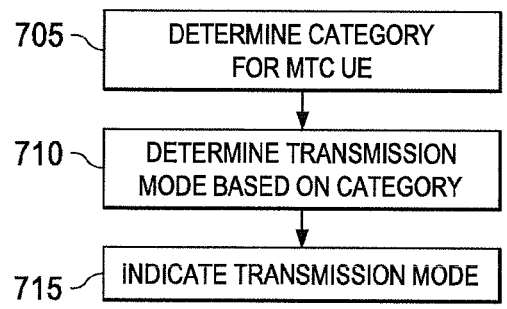
FIG. 7 illustrates a process for supporting a transmission mode for MTC UEs according to embodiments of the present disclosure.

FIG. 7 illustrates a process for supporting a transmission mode for MTC UEs according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, an enhanced node B.

In one method, a new transmission mode is configured for MTC UEs, such as MTC UE 200. That is, based on the UE category (e.g., a new category (or categories) defined for MTC UE) the new transmission mode may be applicable. The base station, such as eNB 102, determines whether the UE is categorized in a new category defined for MTC in block 705. In block 710, determines if a new transmission mode is applicable based on the category defined for MTC UE 200.

In one method, a single DCI format is supported (e.g., DCI Format 1A or modification of DCI Format 1A).

TABLE 5

Transmission Mode and DCI Formats

| Transmission mode | DCI format | Search Space | Transmission scheme of PDSCH corresponding to PDCCH |
|---|---|---|---|
| Mode X | DCI format 1A (or a modification of 1A) | — | If condition 1, Transmission scheme 1 If condition 2, Transmission scheme 2 ... |

In block 715, eNB 102 indicates the applicable transmission scheme. The applicable transmission scheme for decoding can be determined by UE 200 based on one or more of the following conditions:

Configured by network signaling. More specifically, the transmission scheme can be indicated by Master Information Block (MIB) or System Information Block (SIB) or Paging transmissions.

Dependent on a subframe type (e.g., Multi-Broadcast Single Frequency Network (MBSFN) or non-MBSFN subframe)

Dependent on a (sub) UE category or capability (which may be characterized by, but not limited to, one or more of: a number of Rx antennas, data rate requirements, traffic profile, and power requirements).

The supported transmission schemes could be a subset of the following:

Single port (port 7 DMRS) transmission;
Single port (port 0) transmission;
Transmit diversity based on CRS;
Transmit diversity based on DMRS ((port 7,8) or (port 7,9)); and
Multi-port DMRS (each mini-PRB decoded by a different port)
DCI Format Given the reduced complexity of MTC UEs, a new DCI format may be preferred.

The details of DCI Format 1A currently supported in LTE are given below (from 36.212, the contents of which are incorporated by reference):

In some embodiments, DCI Format 1A is used. DCI format 1A is used for the compact scheduling of one PDSCH codeword in one cell and random access procedure initiated by a PDCCH order.

The following information is transmitted by means of the DCI format 1A:

Carrier indicator—0 or 3 bits. This field is present according to the definitions in REF3; and Flag for format0/format1A differentiation—1 bit, where value 0 indicates format 0 and value 1 indicates format 1A.

Format 1A is used for random access procedure initiated by a PDCCH order only if format 1A CRC is scrambled with C-RNTI and all the remaining fields are set as follows:

Localized/Distributed VRB assignment flag—1 bit is set to '0';

Resource block assignment—$\lceil \log_2(N_{RB}^{DL}(N_{RB}^{DL}+1)/2) \rceil$ bits, where all bits shall be set to 1

Preamble Index—6 bits

PRACH Mask Index—4 bits, (see 3GPP TS36.321, "Evolved Universal Terrestrial Radio Access (E-UTRA); Medium Access Control (MAC) protocol specification," (hereinafter "REF5") the contents of which are hereby incorporated by reference.

All the remaining bits in format 1A for compact scheduling assignment of one PDSCH codeword are set to zero Otherwise, Localized/Distributed VRB assignment flag—1 bit as defined in 7.1.6.3 of REF3

Resource block assignment—$\lceil \log_2(N_{RB}^{DL}(N_{RB}^{DL}+1)/2) \rceil$ bits as defined in section 7.1.6.3 of REF3:

For localized VRB:

$\lceil \log_2(N_{RB}^{DL}(N_{RB}^{DL}+1)/2) \rceil$ bits provide the resource allocation For distributed VRB:

If $N_{RB}^{DL}<50$ or if the format 1A CRC is scrambled by RA-RNTI, P-RNTI, or SI-RNTI $\lceil \log_2(N_{RB}^{DL}(N_{RB}^{DL}+1)/2) \rceil$ bits provide the resource allocation Else 1 bit, the MSB indicates the gap value, where value 0 indicates $N_{gap}=N_{gap,1}$ and value 1 indicates $N_{gap}=N_{gap,2}$ ($\lceil \log_2(N_{RB}^{DL}(N_{RB}^{DL}+1)/2) \rceil-1$) bits provide the resource allocation, where $N_{gap}$ is defined in REF2

Modulation and coding scheme—5 bits as defined in section 7.1.7 of REF3

HARQ process number—3 bits (FDD), 4 bits (TDD)

New data indicator—1 bit

If the format 1A CRC is scrambled by RA-RNTI, P-RNTI, or SI-RNTI:

If $N_{RB}^{DL} \geq 50$ and Localized/Distributed VRB assignment flag is set to 1 the new data indicator bit indicates the gap value, where value 0 indicates $N_{gap}=N_{gap,1}$ and value 1 indicates $N_{gap}=N_{gap,2}$.

Else the new data indicator bit is reserved.

Else

The new data indicator bit as defined in REF5

Redundancy version—2 bits

TPC command for PUCCH—2 bits as defined in section 5.1.2.1 of REF3

If the format 1A CRC is scrambled by RA-RNTI, P-RNTI, or SI-RNTI:

The most significant bit of the TPC command is reserved.

The least significant bit of the TPC command indicates column $N_{PRB}^{1A}$ of the TBS table defined of REF3.

If least significant bit is 0 then $N_{PRB}^{1A}=2$ else $N_{PRB}^{1A}=3$.

Else

The two bits including the most significant bit indicates the TPC command

Downlink Assignment Index (this field is present in TDD for all the uplink-downlink configurations and only applies to TDD operation with uplink-downlink configuration 1-6. This field is not present in FDD)–2 bits SRS request—0 or 1 bit. This field can only be present in DCI formats scheduling PDSCH which are mapped onto the UE specific search space given by the C-RNTI as defined in REF3. The interpretation of this field is provided in section 8.2 of REF3.

If UE 200 is not configured to decode PDCCH with CRC scrambled by the C-RNTI, and the number of information bits in format 1A is less than that of format 0, zeros shall be appended to format 1A until the payload size equals that of format 0.

If UE 200 is configured to decode PDCCH with CRC scrambled by the C-RNTI and the number of information bits in format 1A mapped onto a given search space is less than that of format 0 for scheduling the same serving cell and mapped onto the same search space, zeros are appended to format 1A until the payload size equals that of format 0.

If the number of information bits in format 1A belongs to one of the sizes in Table 5.3.3.1.2-1 of REF2, one zero bit is appended to format 1A.

When the format 1A CRC is scrambled with a RA-RNTI, P-RNTI, or SI-RNTI then the following fields among the fields above are reserved:

HARQ process number; and

Downlink Assignment Index (used for TDD only and is not present in FDD).

Figure 8:
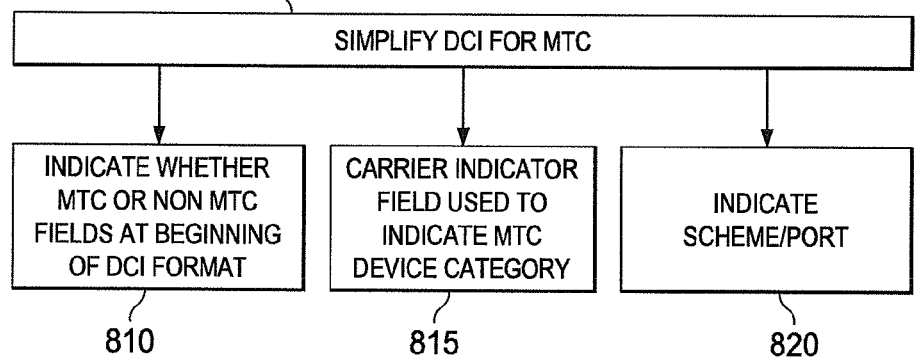
FIG. 8 illustrates a process for indicating the transmission schemes to an MTC device according to embodiments of the present disclosure.

FIG. 8 illustrates a process for indicating the transmission schemes to an MTC device according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, an enhanced node B.

In certain embodiments, a number of simplifications are made to the DCI format considering the new requirements of MTC devices (in block 805). However, in certain embodiments, the new DCI format may only be applicable to the MTC UE category.

MTC Indicator Field

In certain embodiments, (in block 810), a specific field is used at the beginning of DCI Format 1A to indicate whether the following fields are interpreted as an MTC UE or a non-MTC UE. In certain embodiments, a newly designed DCI Format 1A (e.g., 1A' or 1F) is defined to identify whether the fields are interpreted as an MTC UE or a non-MTC UE.

Carrier Indicator Field

In certain embodiments, (in block 815), the carrier indicator field is configured to identify MTC device category. For example, the carrier indicator field is set to 0 bits, for MTC device category.

New Transmission Scheme and Port Indicator Field

In certain embodiments, (in block 820), a single field indicates the transmission scheme and/or port information to be used for decoding. For example, one value of the field indicates single port DMRS based transmission and another value indicates use of 2 or more ports to be used for decoding different parts of a PRB (Multi-port DMRS (mini-PRB cycling) scheme described herein above).

In certain embodiments, another existing field is reinterpreted (e.g., repurposed) to identify MTC device category. For example, any one or more of the distributed/localized flag, carrier indicator field, and the like, can be repurposed, or additionally configured, to identify MTC device category.

TABLE 6

Transmission Scheme and Port Mapping

| Value | Transmission Scheme + Port Mapping |
|---|---|
| 1 | Port 7 DMRS |
| 2 | Ports 7, 8, 9, 10 with four mini-PRBs |
| 3 | Transmit Diversity based on Port 7, 8 DMRS |
| 4 | Port 7 DMRS |
| 5 | Port 8 DMRS |
| 6 | Port 7 DMRS in each RB UE allocated to mini-PRB 1 in each RB |
| 7 | Port 8 DMRS in each RB UE allocated to mini-PRB 2 in each RB |
| 8 | . . . |
| . | . . . |

In certain embodiments, the transmission scheme used (e.g., one of the transmission schemes defined for MTC UE category in the previous embodiments) is signaled separately with a transmission scheme field in the DCI format. In certain embodiments, the port information is also signaled separately. In one example, one or more ports used for decoding is signaled explicitly. In certain embodiments, port mapping (or parameters of a mapping function) in different RBs are explicitly indicated.

Resource Allocation

In certain embodiments, MTC UE 200 is configured on a reduced bandwidth of 1.4 MHz (6RBs) and the resource allocation is redesigned to exploit the feature that only those PRBs within the reduced bandwidth of 6 PRBs can be scheduled, regardless (or independent) of the system bandwidth. Type 2 resource allocation is currently supported with DCI Format 1A based on localized or distributed assignments.

In certain embodiments, either a localized or a distributed resource allocation is supported. The method that is supported can be fixed or configurable.

In certain embodiments for resource allocation, a bitmap is configured to signal the resource blocks (RBs) allocated for the physical downlink shared channel (PDSCH). For example, eNB 102 uses a six bit bitmap for signaling which of the six RBs are allocated for PDSCH.

In certain embodiments, a maximum allocation of N RBs out of the 6 PRBs may be supported. In one illustrative example, N=1. In this case, log 2(6) values can be supported with 3 bits.

In certain embodiments, the maximum number of PRBs that can be scheduled to MTC UE 200 in a subframe is upper-bounded by a certain integer number less than "6." A joint set of localized and distributed configurations is defined for encoding into a bit-field. In one example, up to three PRBs can be scheduled to MTC UE 200, and the RBs selected for allocation could be a subset of:
{1},{2},{3},{4},{5},{6},{1,2},{2,3},{3,4},{4,5},{5,6},
{1,4},{2,5},{2,6},
{1,2,3},{2,3,4},{4,5,6},{1,3,6},{2,4,5}.
By trimming three sets, sixteen values can be supported with four bits. Using this method, four bits can be used to signal resource allocation as opposed to 6+1(flag) bits used to signal resource allocation in Format 1A.

In certain embodiments, the RA field indication excludes the PRBs configured for enhanced Physical Downlink Control Chanel (ePDCCH) transmissions. For example, when PRBs {1,2} are configured for ePDCCH, then the RA field is configured indicate a subset of {3, 4, 5, 6} instead of {1, 2, 3, 4, 5, 6}. Therefore, the number of bits for the RA field can be reduced to 4 bits from 6 bits.

Redundancy Version

In certain embodiments, a fixed redundancy version is supported for all retransmission to MTC UEs, such as MTC UE 200 (e.g., RV0). Therefore, the two bit field for redundancy version is omitted.

HARQ Process

In certain embodiments, a single or fewer HARQ process is supported for an MTC UE 200 (due to relaxed latency/data rate requirements). For example, less than eight (<8) HARQ process can be supported for an MTC UE 200. The HARQ process field can be further reduced to less than three (>3) for frequency Division Duplexing (FDD) or less than four (<4) for Time Division Duplexing (TDD).

Modulation and Coding Scheme

In certain embodiments, a reduced level of Modulation and Coding Scheme (MCS) is supported for MTC UE 200. The supported list of 32 MCS for MTC UE 200 is shown in Table 7:

TABLE 7

Modulation and TBS index table for PDSCH

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

Support for such high granularity in Modulation and Coding Scheme/Transport Block Size (MCS/TBS) is not needed for MTC UE applications. In certain embodiments, a smaller set of modulation is supported. In one example, only Quadrature Phase Shift Keying (QPSK) is supported as shown below.

TABLE 8

Modulation Order

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |

To furthermore reduce number of states for the MCS field to three bits (8 states), two states in the Table 8 can be discarded in the MCS field indication. For example, only $I_{MCS}=0, \ldots, 7$ can be indicated by the MCS field, in which case only three bits are needed for indicating the MCS field.

In certain embodiments, additional MCS are added to support lower rates. In certain embodiments, the MCS field is omitted and MTC UE 200 supports only one MCS (or a pair of modulation order and TBS index). In one example, the one MCS is $I_{MCS}=0$; in another example, $I_{MCS}=1$.

In certain embodiments, only UE specific search space is configured for MTC UE 200. That is, MTC UE 200 does not decode PDCCH in the legacy common search space. Therefore, MTC UE 200 is prevented from accessing legacy common search space.

In certain embodiments, only ePDCCH based control channels are defined for MTC UE 200 for downlink PDSCH data allocations and uplink allocations. In which case, MTC UE 200 performs blind decoding only on ePDCCH.

Figure 9:
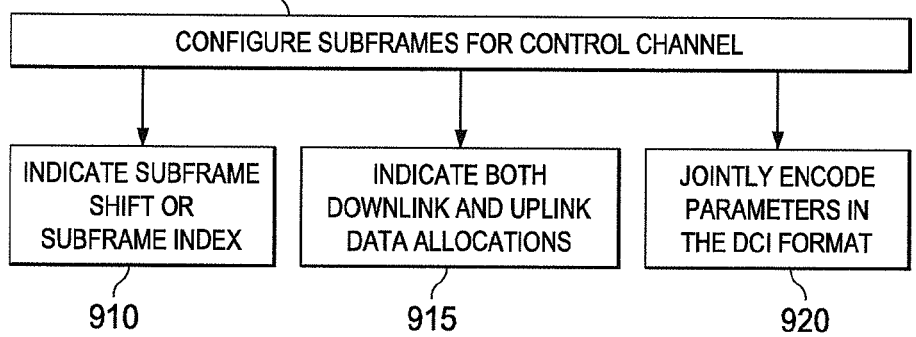
FIG. 9 illustrates a process for configuring subframes for an MTC device according to embodiments of the present disclosure.

FIG. 9 illustrates a process for configuring subframes for an MTC device according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, an enhanced node B.

Control Configuration/Blind Decodes
Reservation of Subframes

In certain embodiments, (in Block 905), a subset of subframes is configured for MTC UE 200 to receive control channels. That is, the MTC UE 200 performs blind decoding for control channels only in those configured subset of subframes. Performs blind decoding only in those configured subset of subframes reduces the blind decoding efforts of MTC UE 200. Such configuration can be applied to PDCCH or ePDCCH or both. The index of the configured subframe for MTC UE 200 can be derived from:
i) Radio Network Temporary Identities (RNTIs); or
ii) Explicit Configuration such as, using MIB/SIB or PDCCH for ePDCCH reservation.

In certain embodiments, (in block 910) a control channel in a subframe assigned to MTC UE 200 includes a field to indicate a subframe shift or a subframe index to indicate a future subframe where the data is transmitted for MTC UE 200. This may apply to PDCCH or ePDCCH or both.

In certain embodiments, (in block 915), a single control format indicates both downlink and uplink data allocations of MTC UE 200. Further a subframe shift or a subframe index is assigned to each of the allocations respectively. In this method, the bit fields from DCI Format 0 and a modified DCI Format 1A (or legacy DCI Format 1A) can be combined to realize a new DCI format.

FIG. 10 illustrates a process for jointly encoding parameters for an MTC device according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, an enhanced node B.

In certain embodiments, (in block 1005), one or more described parameters in the DCI format are jointly encoded. For example, resource allocation and transmission scheme can be jointly encoded.

In certain embodiments, (in block 1010), the first transmission scheme(s) is used for a distributed allocation and a second transmission scheme(s) is used for a localized allocation.

In certain embodiments, (in block 1015), joint encoding of transmission scheme and resource allocation are performed. In one example, a transmission scheme is defined for each value of set of allocated RBs explicitly. Some exemplary associations are captured in Table 9. In one example, as shown in Table 9 (last two rows), for the same set of assigned RBs, a different port and an associated allocation within an RB can be supported.

TABLE 9

Transmission Schemes and Resource Allocations

| States generated by the bit field (transmission scheme and resource allocation) | Resource Allocation (Indices of allocated RBs) | Transmission Scheme |
|---|---|---|
| 0 | 1 | Port 7 DMRS |
| 1 | 1 | Ports 7, 8, 9, 10 with four mini-PRBs |
| 2 | 1 | Transmit Diversity based on Port 7, 8 DMRS |
| ... | ... | ... |
| 6 | {1, 3, 5} | Port 7 DMRS |
| ... | ... | ... |
| 8 | {1, 3, 5} | Port 7 DMRS in each RB UE allocated to mini-PRB 1 in each RB |
| 9 | {1, 3, 5} | Port 8 DMRS in each RB UE allocated to mini-PRB 2 in each RB |

In another method, (in block 1020), a configuration of port association is signaled by higher layer signaling independent of the resource allocation. For example, instead of port 7 DMRS, a different port (e.g., port 8) can be configured for MTC UE 200. In another example, a port hopping configuration (associated port in a given RB and a given subframe) is configured by higher layer signaling.

In certain embodiments, (in block 1025), MTC UE 200 is configured a subset of RBs or subset of ports for enhanced control channels (ePDCCH). Such configuration can be derived implicitly based on one or more of RNTI, subframe index, UE category. Such configuration also can be derived from MIB/SIB decoding.

FIG. 11 illustrates a process higher aggregation for control channels for an MTC device according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, an enhanced node B.

In certain embodiments, (in block 1105), higher aggregation level is supported for MTC UE control channels compared to non-MTC UE control channels. Currently aggregation levels of 1,2,4,8 are supported (i.e., PDCCH is mapped to 1,2,4,8 CCEs respectively where 1 CCE=9 REGs=9*4 REs=72 bits). Higher aggregation levels (e.g., 16) can be supported for the MTC category UE. In one example, higher aggregation level is only supported on ePDCCH. In another example, higher aggregation level is supported only on PDCCH. In one example, higher aggregation level is only supported on common search space or UE specific search space (of PDCCH or ePDCCH).

In certain embodiments, (in block 1110), a fixed aggregation level (e.g., aggregation level 8) or a fixed set of aggregation levels (e.g., {4,8}) can be used for the MTC UE category different from other UE categories. This method reduces the number of blind decoding operations of the MTC UEs.

In certain embodiments, (in block 1115), a fixed aggregation level or levels is configured for MTC UE 200 by higher layer signaling. Such higher layer signaling can be based on MIB/SIB transmission or other Radio Resource Control (RRC) signaling.

PRB Bundling

PRB bundling is currently defined for LTE UEs, where depending on bandwidth configuration, two or three RBs can be assumed to be precoded in a similar fashion for channel estimation purposes. This improves channel estimation performance, but also increases the corresponding complexity. In certain embodiments, for the MTC UE category, PRB bundling is implicitly turned "off", implying that MTC UE 200 should assume that the precoding applied for each PRB can be different.

CSI-RS for MTC

In certain embodiments, one or more CSI-RS configurations (non-zero power and zero power) to be supported are currently signaled to MTC UE 200.

At least one non-zero power CSI-RS configuration is always signaled to MTC UE 200. In certain embodiments, MTC UE 200 is not supposed to be signaled any non-zero power CSI-RS configurations, since feedback may not be set up for MTC UEs. In another method, MTC UE 200 is not supposed to be signaled any CSI-RS configurations (non-zero power/zero-power).

In certain embodiments, different resource element mapping for PDSCH is configured for the MTC UE category. In one example, puncturing of REs is used, when PDSCH allocation of MTC UE 200 overlaps with configured CSI-RS or CRS or other reference symbols. Puncturing implies that the UE decoder assumes that the coded symbols are mapped onto these resources as well as described by the codeword to RE mapping. Alternatively, for rate matching the coded symbols are mapped in sequence by skipping these REs (REs that overlap with other signals).

FIG. 12 illustrates a process for feedback for an MTC device according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, an enhanced node B.

Feedback

MTC UE 200 is configured to perform feedback in block 1205. A large number and variety of feedback modes are currently define in REF3 using PUCCH/PUSCH transmission on the uplink to accommodate different system and UE requirements like channel fading, frequency selectivity, UE speeds, uplink capacity and so forth. Alternatively, MTC UEs need support for very low data rates, highly intermittent traffic and feedback operations, which can be considerably simplified.

In certain embodiments, (in block 1210), MTC UE 200 only feeds back based on a single CSI-RS port or two CSI-RS ports. Therefore, the number of CSI-RS ports that can be configured to MTC UE 200 can be restricted to "1" or "2".

In one method, (in block 1210), MTC UE 200 reports CQI for a single codeword only assuming one or more of the following transmission schemes:
Single port transmission based on DMRS;
Single port transmission based on CRS (port 0);
Transmit Diversity based on CRS;
Transmit Diversity based on DMRS; and
Assuming bandwidth of 6 PRBS.

Feedback with Reduced Bandwidth

In certain embodiments, (in block 1220), MTC UE 200 is configured to be able to use the whole band in an RF sense, but only receive PDSCH over six RBs at a time. This results in savings for baseband (FFT processing, and so forth), but not cost savings for RF.

In certain embodiments, eNB 102 configures a fixed set of resources over time. The configuration can be explicit (via higher layer signaling, MIB/SIB signaling, PDCCH signaling with a bit-field in DCI Format and so forth) or implicit, such as based on RNTI.

In certain embodiments, eNB 102 configures a set of resources that varies over subframe index. Further a hashing function can be used to derive the hopping pattern at MTC UE 200 over subframes. The hashing function can depend on one or more of: configured parameters based on explicit signaling (such as via higher layer signaling, MIB/SIB signaling, PDCCH signaling with a bit-field in DCI Format, and so forth) and parameters based on RNTI, subframe index, subframe configuration (e.g., MBSFN/non-MBSFN).

In certain embodiments, aperiodic feedback is setup for MTC UE 200. The aperiodic can be triggered by a DCI Format 0 (or a modified version).

Whenever MTC UE 200 determines feedback in response to aperiodic CSI format, it is based on a CSI reference resource (including subframe reference) defined as below (see also REF3):

The CSI reference resource is defined as follows:

In the frequency domain, the CSI reference resource is defined by the group of downlink physical resource blocks corresponding to the band to which the derived CQI value relates.

In the time domain, the CSI reference resource is defined by a single downlink subframe $n-n_{CQI\_ref}$, where for periodic CSI reporting $n_{CQI\_ref}$ is the smallest value greater than or equal to four, such that it corresponds to a valid downlink subframe;

where for aperiodic CSI reporting $n_{CQI\_ref}$ is such that the reference resource is in the same valid downlink subframe as the corresponding CSI request in an uplink DCI format.

where for aperiodic CSI reporting $n_{CQI\_ref}$ is equal to four and downlink subframe $n-n_{CQI\_ref}$ corresponds to a valid downlink subframe, where downlink subframe $n-n_{CQI\_ref}$ is received after the subframe with the corresponding CSI request in a Random Access Response Grant.

A downlink subframe in a serving cell is considered to be valid if:

it is configured as a downlink subframe for that UE (e.g., MTC UE 200), and except for transmission mode 9, it is not an MBSFN subframe, and it does not contain a Downlink Pilot Time Slot (DwPTS) field in case the length of DwPTS is $7680 \cdot T_S$ and less, and it does not fall within a configured measurement gap for that UE (e.g., MTC UE 200), and for periodic CSI reporting, it is an element of the CSI subframe set linked to the periodic CSI report when that UE (e.g., MTC UE 200) is configured with CSI subframe sets.

If there is no valid downlink subframe for the CSI reference resource in a serving cell, CSI reporting is omitted for the serving cell in uplink subframe n.

In the layer domain, the CSI reference resource is defined by any RI and Precoding Matrix Index (PMI) on which the Channel Quality Index (CQI) is conditioned.

In one method, MTC UE 200 determines the reduced bandwidth (e.g., 6RB bandwidth) to report CQI on based on one or more of:

i) Subframe on which the aperiodic CSI is requested;
ii) Information from the DCI format with the aperiodic CSI request;
iii) Mapping that determines the 6RB bandwidth assigned to MTC UE 200 over subframes, where such mapping is determined as described in one or more embodiments above (e.g., higher layer configured parameters, RNTI, and so forth);
iv) Bandwidth over a fixed subframe in past or future, where such fixed subframe is determined based on one or more of subframe in which aperiodic request is received, subframe in which uplink control is transmitted, higher layer parameters, RNTI.

In certain embodiments, if an aperiodic CSI request is appended to a DCI format with a downlink grant (e.g., DCI Format 1A or similar that includes at least downlink resource assignment parameters), then the CSI feedback by MTC UE 200 on the uplink is based on the bandwidth of 6RBs that is mapped in the subframe in which DL assignment is made. In certain embodiments, such DCI format may also include the uplink assignment for the transmission of control information.

In certain embodiments, the DCI format that indicates the aperiodic CSI request (e.g., DCI Format 0 used for uplink grant) includes an additional field, such as CSIBandwidthConfiguration, that indicates the reduced bandwidth (e.g., 6 RBs) on which the feedback is requested.

Table 10 illustrates the CQI table currently supported:

TABLE 10

| 4-bit CQI Table | | | |
| --- | --- | --- | --- |
| CQI index | modulation | code rate × 1024 | efficiency |
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16 QAM | 378 | 1.4766 |
| 8 | 16 QAM | 490 | 1.9141 |
| 9 | 16 QAM | 616 | 2.4063 |
| 10 | 64 QAM | 466 | 2.7305 |
| 11 | 64 QAM | 567 | 3.3223 |
| 12 | 64 QAM | 666 | 3.9023 |
| 13 | 64 QAM | 772 | 4.5234 |
| 14 | 64 QAM | 873 | 5.1152 |
| 15 | 64 QAM | 948 | 5.5547 |

In certain embodiments, a reduced CQI size (<4 bit) is supported for MTC UEs. For example, the CQI only includes levels corresponding to QPSK modulation, requiring 3 bits.

TABLE 11

| CQI index | modulation | code rate × 1024 | efficiency |
| --- | --- | --- | --- |
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |

In certain embodiments, two bits are used. In one example, the lower four levels are used for this purpose. In one example, the lower four levels of CQI index are {1}, {1}, {2} and {3}. In another example, the lower four levels of CQI index exclude the out-of-range state (CQI index 0), and hence are {1}, {2}, {3} and {4}.

In certain embodiments, the CSI feedback for an MTC UE only includes a single codeword CQI. Furthermore, such CQI can be represented with 1-4 bits. In one method, a reduced size PMI also is supported.

In certain embodiments, due the small size of CSI supported, the CSI of MTC UE 200 is attached to (e.g., piggy backed on) other uplink transmission.

In certain embodiments, the CSI of MTC UE 200 is transmitted on uplink simultaneously with other uplink information. The other uplink information transmitted with the CSI can include one or more of:

i) Uplink data on PUCCH;
ii) ACK/NACK on PUCCH;
iii) Scheduling Requests (SR) on PUCCH;
iv) RACH transmissions; and
v) Data transmission on PUSCH.

In certain embodiments, the CSI is jointly encoded with the other uplink information. For example, eNB 102 can jointly encode the CSI with one or more of: uplink data, ACK/NACK, SR and so forth.

In certain embodiments, an MTC category UE, such as MTC UE 200, transmits the CSI on one of or more of the above channels by one or more of the following methods:

i) Triggered by a DCI format;
ii) Higher layer configuration; and
iii) Triggered by ACK/NACK value (e.g., if NACK include CSI).

In certain embodiments, one or two bit CSI is transmitted using PUCCH format 1a/1b. In certain embodiments a new feedback PUCCH format is defined on uplink for MTC UE 200 for transmission of the new CSI format size.

ePDCCH/PDCCH vs PDSCH Association

In certain embodiments, one or more of the parameters of a successfully decoded PDCCH/ePDCCH are configured to implicitly indicate one or parameters related to PDSCH assignment. In certain embodiments, the one or more parameters of ePDCCH could be from:

i) The location of PDCCH/ePDCCH (subframe index, RB index, port mapping of decoded ePDCCH);

ii) The location with respect to search space (e.g., the blind decoding candidate index, the smallest CCE/eCCE index (e.g., n_CCE/n_eCCE) of the decoded CCH/eCCH); and iii) Aggregation level.

The one or more parameters related to PDSCH assignment can include one or more of:

i) Resource allocation;

ii) Port mapping or related parameters;

iii) Transmission scheme;

iv) Subframe shift/location of PDSCH assignment; and v) Other fields that are currently signaled in a DCI format supported in Release-10 LTE specification (e.g., Format 1/1A/1B, 2/2A/2B.)

In one example, the resource allocation can be derived from the smallest CCE/eCCE index of the successfully decoded PDCCH/ePDCCH.

In one example, the number of scheduled PRBs is implicitly indicated by the CCE aggregation level of the successfully decoded PDCCH/ePDCCH. For example, the number of scheduled PRBs is proportional to the CCE aggregation level. This is useful to reduce number of bits for the RA field and this relies on the hypothesis that MTC UE 200 has more or less the same number of bits to receive or transmit. In certain embodiments, a higher number of PRBs are scheduled to transmit or receive PUSCH/PDSCH in case the DL channel condition is bad (or large number of CCEs can be used for a transmission of ePDCCH/PDCCH).

In certain embodiments, the one or more of the parameters of a successfully decoded PDCCH/ePDCCH (e.g., the parameters as described herein above) implicitly indicate:

i) The one or more parameters of an uplink assignment; or ii) The one or more parameters of a feedback configuration.

In one example, the RB index of a successfully decoded ePDCCH indicates the subband or RBs over which the feedback must be computed.

Although various features have been shown in the figures and described above, various changes may be made to the figures. For example, the size, shape, arrangement, and layout of components shown in FIGS. 1-6 are for illustration only. Each component could have any suitable size, shape, and dimensions, and multiple components could have any suitable arrangement and layout. Also, various components in FIGS. 1-6 could be combined, further subdivided, or omitted and additional components could be added according to particular needs. Further, each component in a device or system could be implemented using any suitable structure(s) for performing the described function(s). In addition, while FIGS. 7-12 illustrate various series of steps, various steps in FIG. 7-12 could overlap, occur in parallel, occur multiple times, or occur in a different order. In addition, although illustrated as individual embodiments, various embodiments can be combined with other embodiments in whole or part without departing from the scope of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station configured to communicate with at least one user equipment (UE) configured for machine type communications (MTC), the base station comprising:
   processing circuitry configured to determine a transmission scheme based on a category of the at least one UE; and
   a transmitter configured to transmit, using a determined transmission scheme, a physical downlink shared channel (PDSCH) in a reduced bandwidth to the at least one UE.

2. The base station as set forth in claim 1, wherein the determined transmission scheme comprises a transmit diversity scheme.

3. The base station as set forth in claim 1, wherein the determined transmission scheme comprises single port demodulation reference signal (DMRS) transmission scheme, wherein a single DMRS port is used for channel estimation.

4. The base station as set forth in claim 1, wherein the determined transmission scheme comprises a multi-port demodulation reference signal (DMRS) transmission scheme, wherein the processing circuitry uses a codeword/physical resource block (PRB) pair and wherein each port corresponds to a mini-resource block (mini-RB) within a PRB pair.

5. The base station as set forth in claim 4, wherein at least one of:
   at least one resource element group is assigned to a mini-PRB; and
   two or more resource element groups are assigned to the mini-PRB.

6. The base station as set forth in claim 4, wherein at least one of:
   a first mini-PRB is mapped to a first DMRS port and a second mini-PRB is mapped to a second DMRS port; and
   two or more mini-PRBs are mapped to a DMRS port.

7. The base station as set forth in claim 1, wherein the processing circuitry is configured to indicate the transmission scheme to the at least one UE.

8. The base station as set forth in claim 7, wherein the processing circuitry is configured to at least one of:
   indicate, in a specific field at a beginning of DCI Format 1A, whether a plurality of fields in the DCI Format 1A are MTC or non-MTC;
   indicate, in a carrier indicator field, and MTC category;
   indicate at least one of the determined transmission scheme and port information in single field.

9. The base station as set forth in claim 7, wherein the processing circuitry is configured to at least one of:
   indicate a subframe shift;
   indicate a subframe index;
   indicate downlink and uplink data allocations;
   jointly encode transmission scheme and resource allocation;
   utilize a first transmission scheme for distributed allocations and a second transmission scheme for localized allocations; and
   configure subset of resource blocks or ports.

10. A method for communicating with at least one user equipment (UE) configured for machine type communications (MTC), the method comprising:
    identifying a category of the at least one UE;

determining a transmission scheme based on the category of the at least one UE; and transmitting, using the determined transmission scheme, a physical downlink shared channel (PDSCH) in a reduced bandwidth to the at least one UE.

11. The method as set forth in claim 10, wherein the determined transmission scheme comprises a transmit diversity scheme.

12. The method as set forth in claim 10, wherein the determined transmission scheme comprises single port demodulation reference signal (DMRS) transmission scheme, wherein a single DMRS port is used for channel estimation.

13. The method as set forth in claim 10, wherein the determined transmission scheme comprises a multi-port demodulation reference signal (DMRS) transmission scheme, wherein the processing circuitry uses a codeword/physical resource block (PRB) pair and wherein each port corresponds to a mini-resource block (mini-RB) within a PRB pair.

14. The method as set forth in claim 13, further comprising at least one of:
    assigning at least one resource element group to a mini-PRB; and
    assigning two or more resource element groups to the mini-PRB.

15. The method as set forth in claim 13, further comprising at least one of:
    mapping a first mini-PRB to a first DMRS port and a second mini-PRB is mapped to a second DMRS port; and
    mapping two or more mini-PRBs to a DMRS port.

16. The method as set forth in claim 10, further comprising indicating the transmission scheme to the at least one UE.

17. The method as set forth in claim 16, further comprising at least one of:
    indicating, in a specific field at a beginning of DCI Format 1A, whether a plurality of fields in the DCI Format 1A are MTC or non-MTC;
    indicating, in a carrier indicator field, and MTC category;
    indicating at least one of the determined transmission scheme and port information in single field.

18. The method as set forth in claim 16, further comprising at least one of:
    indicating a subframe shift;
    indicating a subframe index;
    indicating downlink and uplink data allocations;
    jointly encoding transmission scheme and resource allocation;
    utilizing a first transmission scheme for distributed allocations and a second transmission scheme for localized allocations; and
    configuring subset of resource blocks or ports.

19. For use in a wireless communications network, a user equipment (UE) configured for machine type communications (MTC), the UE comprising:
    a receiver configured to receive a physical downlink shared channel (PDSCH) in a reduced bandwidth from at least one base station; and
    processing circuitry configured to determine a transmission scheme utilized by at least one base station, the transmission scheme selected by the at least one base station based on a category type of the UE.

20. The UE as set forth in claim 19, wherein the processing circuitry is configured to at least one of:
    transmit a feedback report based on at least one single channel state information-reference signal (CSI-RS) port;
    perform blind decoding on a subset of subframes, wherein the processing circuitry further is configured to derive the subframes from one or more of Radio Network Temporary Identities and an explicit configuration; and
    determine the transmission scheme based on at least one of:
    a network signaling;
    a subframe type;
    a UE category; and
    a UE capability.

* * * * *